United States Patent [19]
Brinkmann et al.

[11] 3,723,574
[45] Mar. 27, 1973

[54] BLOCK COPOLYESTERS CONSISTING ESSENTIALLY OF LINEAR SATURATED POLYESTER AND POLYSTYRENE-BUTADIENE UNITS

[75] Inventors: Ludwig Brinkmann; Walter Herwig, both of Frankfurt am Main, Germany

[73] Assignee: Farbwerke Hoechst Aktiengesellschaft Vormals Meister Lucius & Brunning, Frankfurt am Main, Germany

[22] Filed: Jan. 22, 1971

[21] Appl. No.: 108,987

Related U.S. Application Data

[63] Continuation of Ser. No. 761,314, Sept. 20, 1968, abandoned.

[30] Foreign Application Priority Data

Oct. 7, 1967 Germany..................P 16 94 197.2

[52] U.S. Cl. ................................260/873, 260/75 T
[51] Int. Cl. ..............................................C08g 39/10
[58] Field of Search ............260/873, 75, 75 T, 75 A

[56] References Cited

UNITED STATES PATENTS 3,598,882   8/1971   Brinkmann et al...................260/873

*Primary Examiner*—William H. Short
*Assistant Examiner*—Edward Woodberry
*Attorney*—Curtis, Morris & Safford

[57] ABSTRACT

Thermoplastic block copolyesters comprising linear saturated polyesters and polystyrene-butadiene units which can be moulded into shaped articles having a high dimensional stability, impact strength and bending strength.

12 Claims, No Drawings

BLOCK COPOLYESTERS CONSISTING ESSENTIALLY OF LINEAR SATURATED POLYESTER AND POLYSTYRENE-BUTADIENE UNITS

This application is a continuation of Ser. No. 761,314, filed Sept. 20, 1968, now abandoned.

It is known to process thermoplastic moulding compositions of linear saturated polyesters of aromatic dicarboxylic acids and aliphatic or cycloaliphatic diols to give shaped articles.

It is furthermore known that the dimensional stability of the polyester compositions can be improved by adding nucleating agents. The resulting shaped articles are however characterized by only a moderate impact strength.

It has now been found that block copolyesters derived from a. linear saturated polyesters of aromatic dicarboxylic acids and aliphatic and/or cycloaliphatic diols and b. 2 to 20 percent by weight of polystyrene-butadiene diols, relative to the total quantity, and which at an impact strength of $F_{20} \geq 70$ cm have a reduced specific viscosity of 0.6 to 2.0 dl/g (measured in a 1 percent strength solution of phenol/tetrachlorethane, 60 : 40, at 25°C) possess outstanding properties.

These copolyesters can be prepared by reacting the linear polyesters with the polymeric diols and optionally subjecting the reaction products to a post-condensation in the melt or in the solid state. It is also possible already to add the polystyrene-butadiene diol during the transesterification of dimethylterephthalate with aliphatic or cycloaliphatic diols. Polystyrene butadiene diol may be prepared in accordance with the methods described in U.S. Pat. No. 3,055,952.

The post-condensation is appropriately carried out in the presence of an inert gas such as for example nitrogen. The incorporation of polystyrene-butadiene diols into polyesters results in block polycondensates having polystyrene-butadiene units which are distinguished by a significantly improved impact strength compared to the pure polyester without other valuable properties such as hardness and abrasion resistance suffering.

The polystyrene-butadiene diol used for the modification has a viscosity of 112 to 450 poises measured at 30°C. The hydroxyl number is between 18 and 90 mg KOH/g.

Polyethylene glycol terephthalate is preferred as the linear saturated polyester of aromatic dicarboxylic acids and aliphatic diols. It is also possible to use other polyesters, for example poly-1,4-dimethylolcyclohexane terephthalate. It is also possible to use, alongside the terephthalic acid, small quantities of other aromatic dicarboxylic acids such as naphthalene-1,4-dicarboxylic acid or also aliphatic dicarboxylic acids such as for example adipic acid. Equally, the diol component can be modified within certain limits by adding small quantities of an aliphatic diol, for example butanediol-1,4, neopentyl glycol or a cycloaliphatic diol, for example 1,4-dimethylolcyclohexane.

The polyesters should have a reduced specific viscosity (measured in a 1 percent strength solution of phenol/tetrachlorethane, 60:40, at 25°C) of between 0.6 and 2.0 dl/g, preferably between 0.9 to 1.6 dl/g.

It is also possible to start with polyesters of low reduced specific viscosity and to bring about the desired higher viscosity by post-condensation during the mixing and trans-esterification process.

The incorporation of polystyrene-butadiene units into the polyester by trans-esterification, with the formation of block structures, is advantageously effected in the melt.

For this purpose, the polyester melt is combined with the polystyrene-butadiene diol and thoroughly mixed with exclusion of air and moisture. The trans-esterification is stopped when the desired viscosity increase has been attained and the polycondensation product is converted into granular form according to usual methods.

Another possibility for the formation of block polycondensates consists of granulating the homogeneous mixture of the polyester with the polystyrene-butadiene diol in an extruder and subjecting the granular material to a post-condensation in the solid phase at elevated temperature and in vacuo. The speed of the solid condensation increases with increasing temperature. The temperature should be so chosen that no sintering of the initially introduced granules takes place during the transesterification.

In order to increase the impact strength of the polyesters, 2 to 20, preferably 5 to 15, percent by weight of polystyrenebutadiene diol are added to them.

In order to increase the speed of crystallization and the degree of crystallization the condensation of polyesters with polystyrene-butadiene diol can be effected in the melt or in the solid phase in the presence of nucleating agents. The nucleating agent can also be applied subsequently to the high molecular block polycondensate by rolling the polyester granules with the nucleating agent for some time under nitrogen or in vacuo at room temperature.

Finely divided inorganic substances, optionally also combined with organic compounds, may be used as nucleating agents. Polyester compositions which for example contain talc, aluminum silicates or an organic pigment, possess a high speed of crystallization so that on manufacturing shaped articles, especially by the injection moulding process, shaped articles having a high crystalline component are obtained, which hardly change even above the second-order transition temperature of the polyester. This ensures that the shaped articles manufactured in this way from the high molecular polyesters are very stable dimensionally and do not shrink.

It is advisable to keep the water content of the granular condensation products according to the invention, which possess a block structure, at below 0.01 percent by weight. The polyester granules can be provided with a coating of an inert hydrophobic substance such as for example paraffin or wax. This can for example be effected by applying 0.4 percent by weight of a wax of drop point 56°C by rolling at 90°C under nitrogen for 5 hours.

The processing of the polyester compositions according to the invention to give shaped articles such as gearwheels, spindle bearings and the like takes place at mould temperatures above their second-order transition temperature. Hereupon shaped articles are produced which alongside good dimensional stability also possess increased impact strength coupled with high flexural strength. It is also possible to manufacture reinforced polyester compositions by combination of the block polyesters according to the invention with fillers which are in themselves known, and to manufacture blends by mixing with other polyesters, and these measures lead to products having improved properties.

EXAMPLE 190 parts of finely divided polyethylene terephthalate having a reduced specific viscosity of 0.865 dl/g measured in a 1 percent strength solution of phenol/tetrachlorethane, 60:40, at 25°C) and 10 parts of polystyrenebutadiene diol (melt viscosity 225 poise measured at 30°C) were homogeneously fused at 270°C in vacuo at 0.8 mm, whilst stirring. After 1.5 hours the melt was cooled, the polycondensate comminuted and the reduced specified viscosity determined. It was 0.768 dl/g, (measured in a 1 percent strength solution in phenol/tetrachlorethane, 60:40, at 25°C). Thereafter the product was subjected to solid condensation in a rotating apparatus at 240°C in vacuo for 13 hours, and a polycondensate having a reduced specific viscosity of 1.18 dl/g (measured in a 1 percent strength solution of phenol/tetrachlorethane, 60:40, at 25°C) was thereby obtained. This was rolled for 2 hours under nitrogen, at room temperature, with 0.2 percent by weight of china clay Dinkie A for nucleating purposes. Thereafter sheets of size 60 × 60 × 2 mm were injection-moulded from this polyester at 270°C. The mould temperature was 150°C and the injection time 15 seconds.

The impact strength of these sheets was tested by a drop test. For this purpose, the injection-moulded sheets were subjected to an impact stress by allowing a falling body sliding on low friction tracks to drop vertically from different heights onto the sheet clamped in a frame. The tip of the hammer represented a hemisphere of radium $r = 10$ mm and the weight of the dropping hammer was 500g. The dropping height $F_{20}$ was employed as a measure of the impact strength. This is the height at which the impact energy sufficed to cause fracture in 20 percent of the tested sheets. 10 sheets were tested for each height. The drop height of the injection-moulded polycondensate was $F_{20} = 80$ cm. The impact strength of a polyester of terephthalic acid and ethylene glycol having a reduced specific viscosity of 1.40 dl/g, measured in a 1 percent strength solution in phenol/tetrachlorethane, 60:40, at 25°C, was employed for comparison. It was $F_{20} = 50$ cm.

We claim:

1. A linear, block-copolyester consisting essentially of units derived from
    a. a linear, saturated polyester of an aromatic dicarboxylic acid and an aliphatic or cycloaliphatic diol having a reduced specific viscosity of between 0.6 and 2.0 dl/g., and
    b. 2 to 20 percent by weight, relative to the total composition, of polystyrene-butadiene diol initially having a viscosity of from 112 to 450 poises measured at 30°C. and a hydroxyl number between 18 and 90 mg KOH/g.,
said block-copolyester having an impact strength of $F_{20} \geq 70$ cm. and a reduced specific viscosity of from 0.6 to 2.0 dl/g, measured in a 1 percent solution of 60:40 phenol/tetrachloroethane at 25°C.

2. A block-copolyester as defined in claim 1, wherein the linear saturated polyester is polyethylene terephthalate.

3. A block-copolyester as defined in claim 1, wherein the linear saturated polyester is poly-1,4-dimethylolcyclohexane terephthalate.

4. A block-copolyester as defined in claim 1, wherein the linear saturated polyester contains, in addition to terephthalic acid units, units of up to 10 percent by weight of other aromatic or aliphatic dicarboxylic acids.

5. A block-copolyester as defined in claim 1, wherein the linear saturated polyester contains, in addition to terephthalic acid units, units of adipic acid and/or naphthalene-1,4-dicarboxylic acid.

6. A block-copolyester as defined in claim 1, wherein the linear saturated polyester contains, in addition to ethylene glycol units, up to 10 percent by weight of units of other aliphatic or cycloaliphatic diols.

7. A block-copolyester as defined in claim 1, wherein the linear saturated polyester contains, in addition to ethylene glycol units, units of butane-diol-1,4, neopentyl glycol or 1,4-dimethylolcyclohexane.

8. A block-polyester as defined in claim 1, wherein the linear saturated polyester has a reduced specific viscosity of from 0.9 to 1.6 dl/g, measured in a 1 percent solution of 60 : 40 phenol/tetrachlorethane at 25°C.

9. A block-copolyester as defined in claim 1, wherein the polystyrene-butadiene units are incorporated in the molten state with the exclusion of air and moisture.

10. A block-copolyester as defined in claim 1, obtained by granulating in the extruder a homogeneous mixture of the polyester and the polystyrene-butadiene diol and subjecting the solid granules to a post-condensation condensation at elevated temperature and under reduced pressure.

11. A block-copolyester as defined in claim 1, containing 5 to 15 percent by weight of polystyrene-butadiene units.

12. A shaped, injection molded article obtained from the block-copolyester defined in claim 1.

* * * * *